May 23, 1933.    D. G. GRISWOLD ET AL    1,910,011
AUTOMATIC, SEMIAUTOMATIC, OR TIME CONTROLLED WATER SOFTENER
Filed July 19, 1926    7 Sheets-Sheet 3
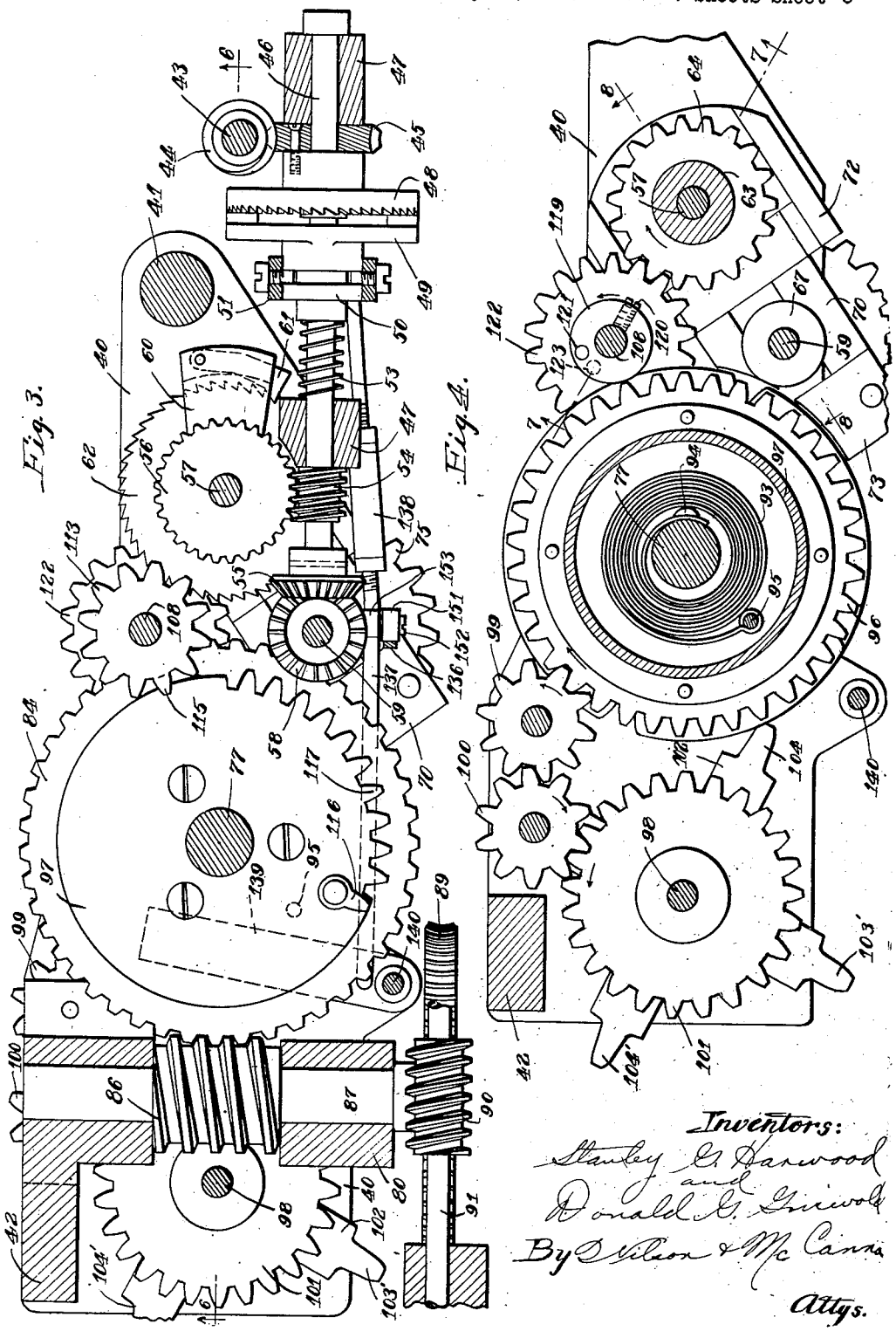
Inventors:
Stanley G. Harwood
and
Donald G. Griswold
By Wilson & McCanna
Attys.

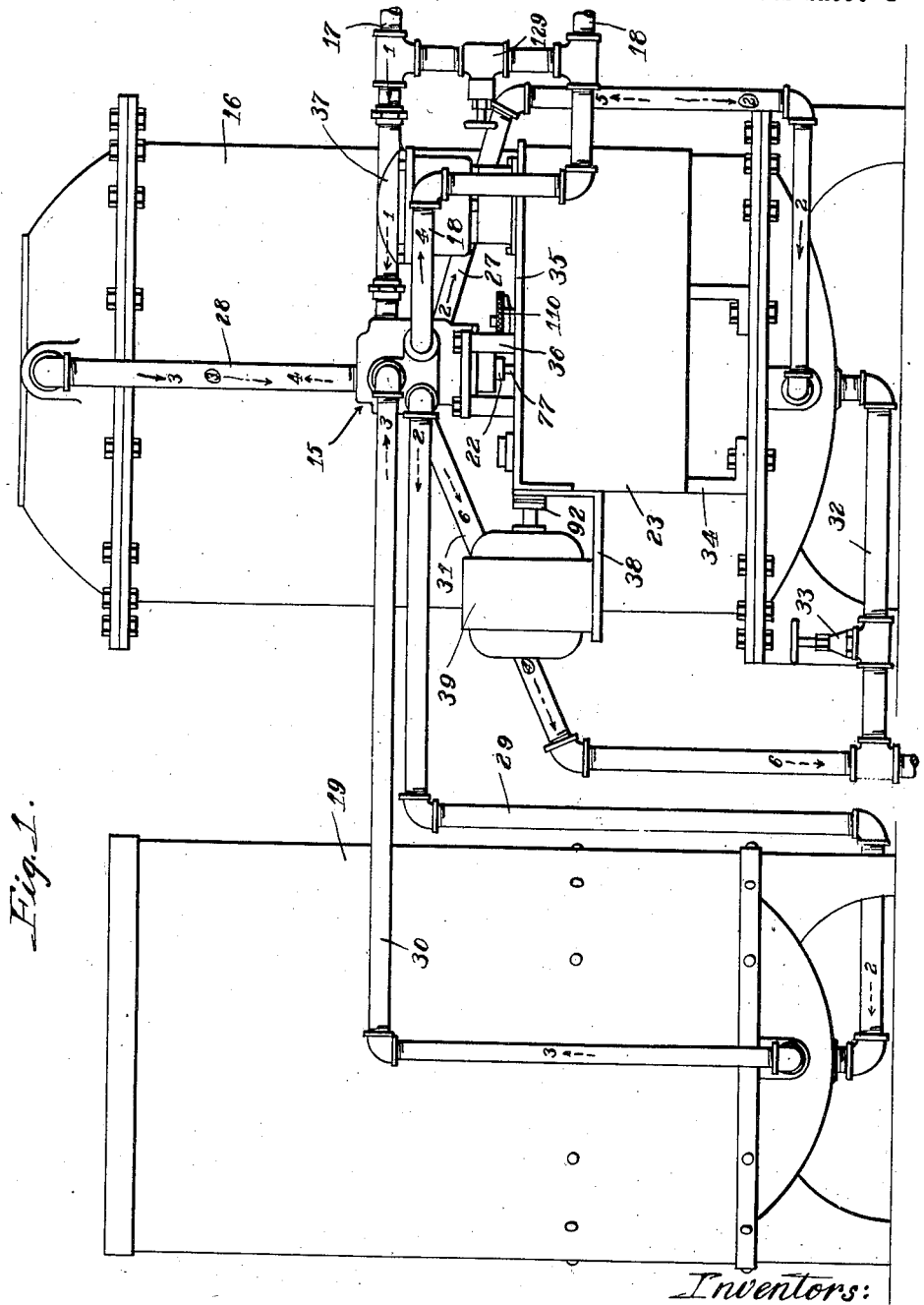

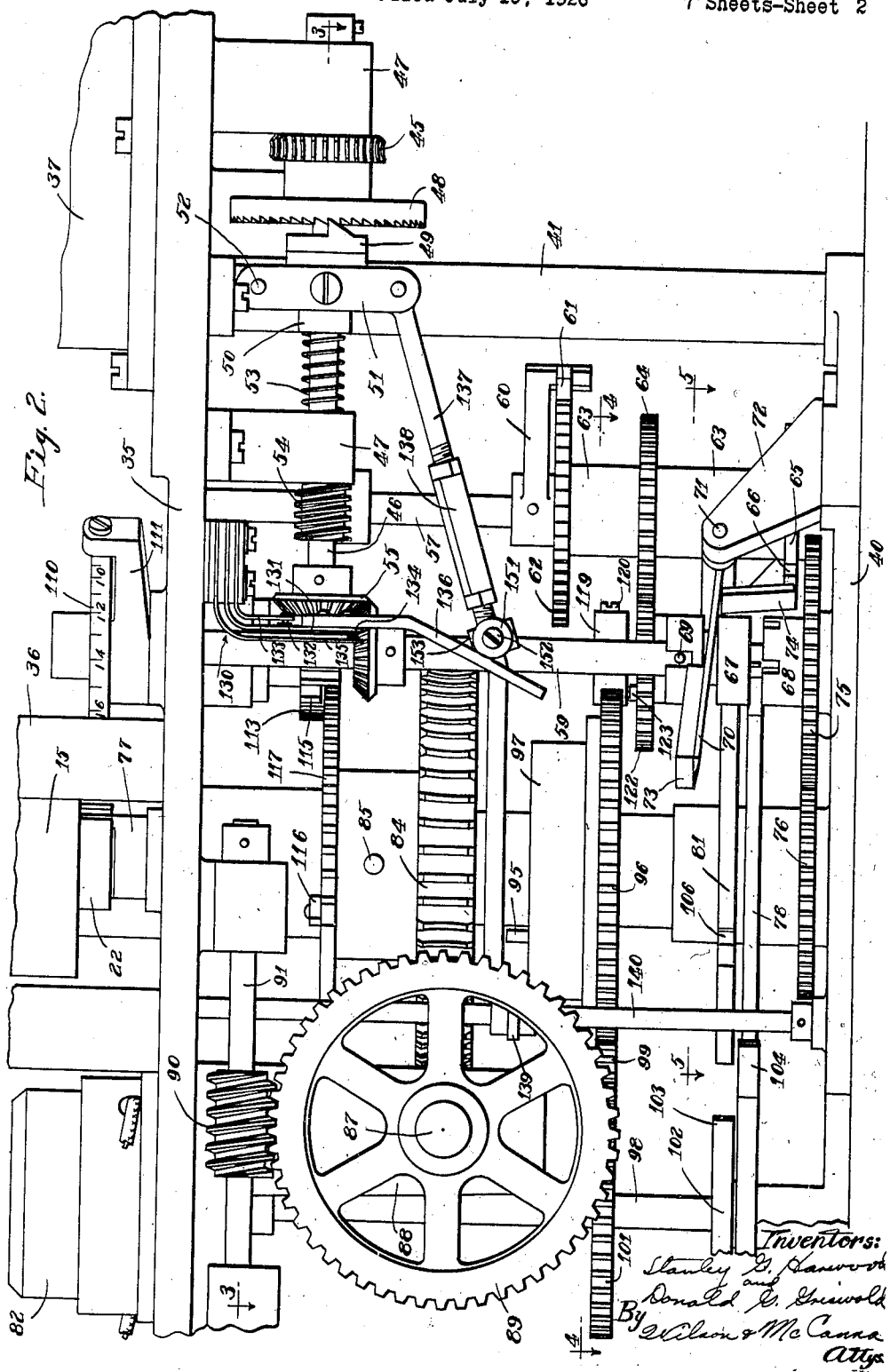

May 23, 1933.  D. G. GRISWOLD ET AL  1,910,011
AUTOMATIC, SEMIAUTOMATIC, OR TIME CONTROLLED WATER SOFTENER
Filed July 19, 1926  7 Sheets-Sheet 4
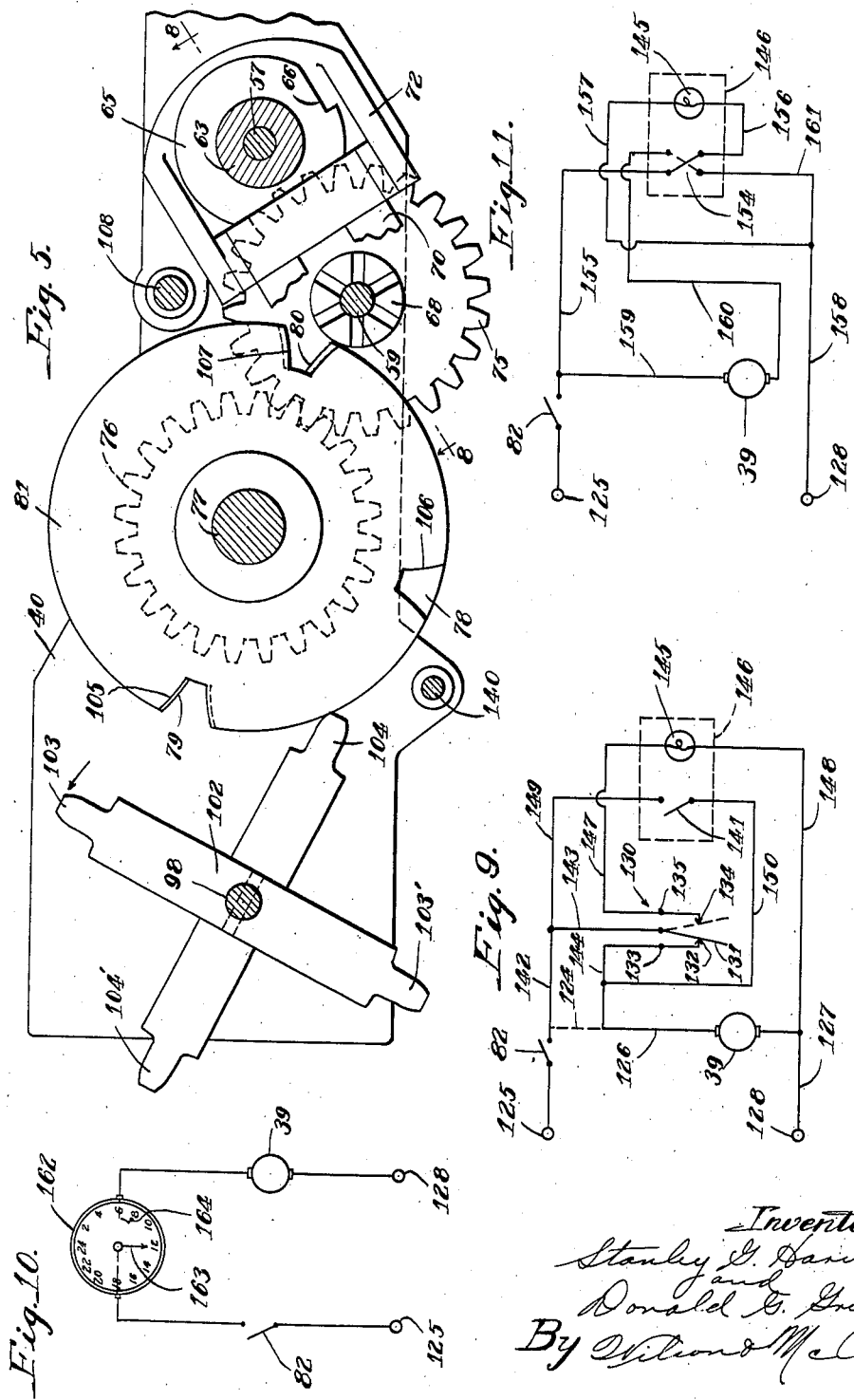

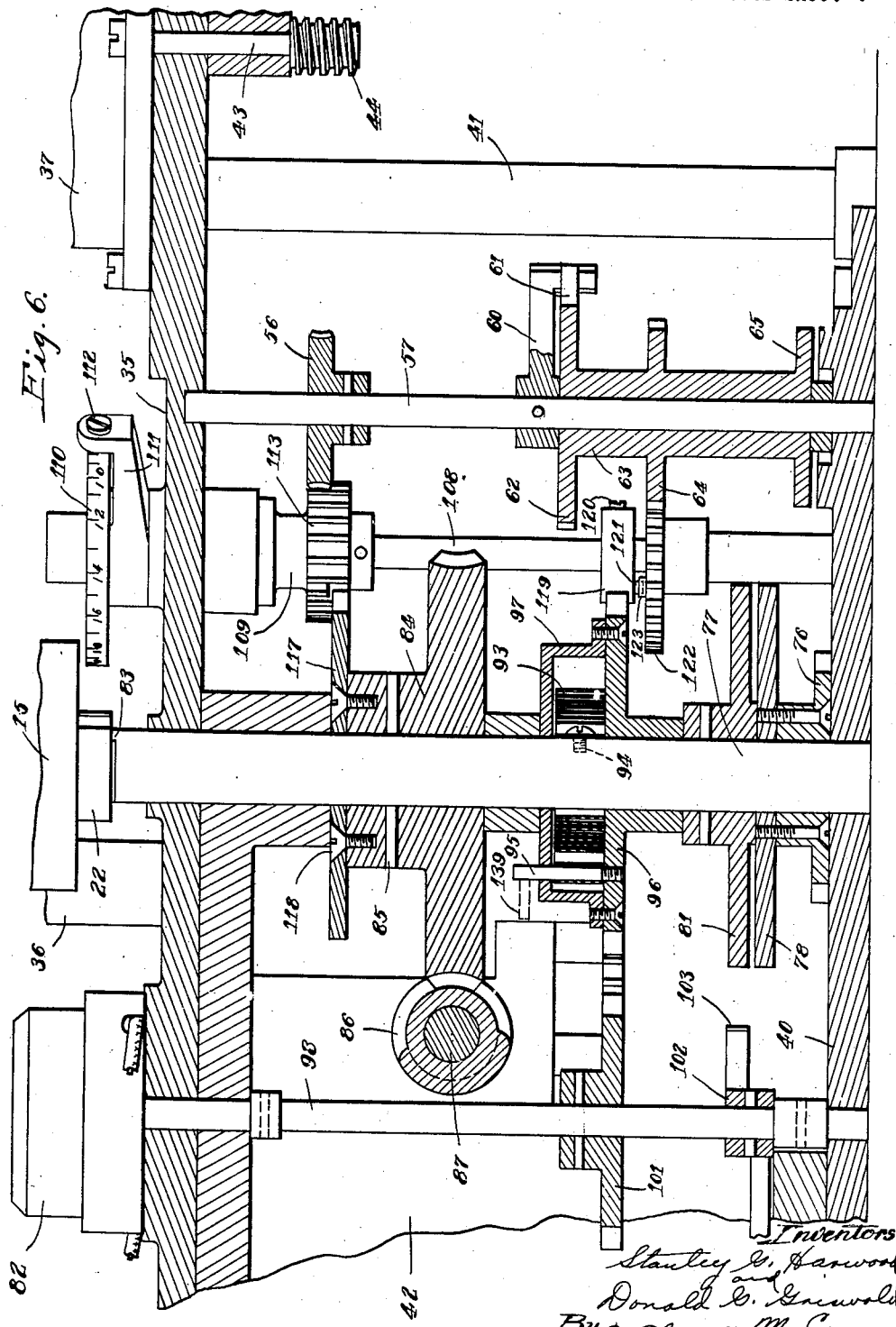

Inventors:
Stanley G. Harwood
Donald G. Griswold
By Wilson & McCanna
Attys.

May 23, 1933.    D. G. GRISWOLD ET AL    1,910,011
AUTOMATIC, SEMIAUTOMATIC, OR TIME CONTROLLED WATER SOFTENER
Filed July 19, 1926    7 Sheets-Sheet 7

Patented May 23, 1933

1,910,011

UNITED STATES PATENT OFFICE

DONALD G. GRISWOLD AND STANLEY G. HARWOOD, OF ROCKFORD, ILLINOIS, ASSIGNORS, BY MESNE ASSIGNMENTS, TO THE PERMUTIT COMPANY, OF WILMINGTON, DELAWARE, A CORPORATION OF DELAWARE

AUTOMATIC, SEMIAUTOMATIC OR TIME CONTROLLED WATER SOFTENER

Application filed July 19, 1926. Serial No. 123,400.

Our invention relates to water softeners operating on the base-exchange principle and is more particularly concerned with a softener capable of operating fully automatically, semi-automatically, or as time-controlled.

This invention constitutes an improvement on the device of our application, Serial No. 17,446, filed March 21, 1925, now issued as Patent No. 1,692,776, dated November 20, 1928, and the principal object thereof is to provide a novel mechanism under the control of a water meter of the usual type having moving parts measuring the flow of water through the softener for operating a valve controlling the connections between a water softener tank and the water supply and service systems therefor and between the softener tank and a regenerating brine tank.

Further objects of the invention are:

First, to provide a mechanism of the character described capable of being set for different hardnesses of water to determine how much hard water shall be permitted to flow through the softener for softening between regenerating operations.

Second, to provide a mechanism of this kind wherein the time of regeneration may be selected to suit the convenience of the user so that the regeneration may not occur at an inopportune time.

Third, to provide a mechanism incorporating a motor, or other suitable electrically operated device, the source of current for which is controlled by the meter so that when once set into operation the device operates the valve.

A still further object is to provide a mechanism of this kind which requires no attention on the part of the user when once installed, the user being permitted only to determine the time of regeneration, as was pointed out above. Aside from this the only concern of the operator shall be that of maintaining the supply of salt in the regenerating brine tank.

The invention is illustrated in the accompanying drawings, wherein—

Figure 1 is a view of a complete installation consisting of a softener tank, regenerating brine tank, control valve, and valve operating mechanism;

Fig. 2 is a side view of the valve operating mechanism removed from the casing in which the same operates in an oil bath;

Figure 7:
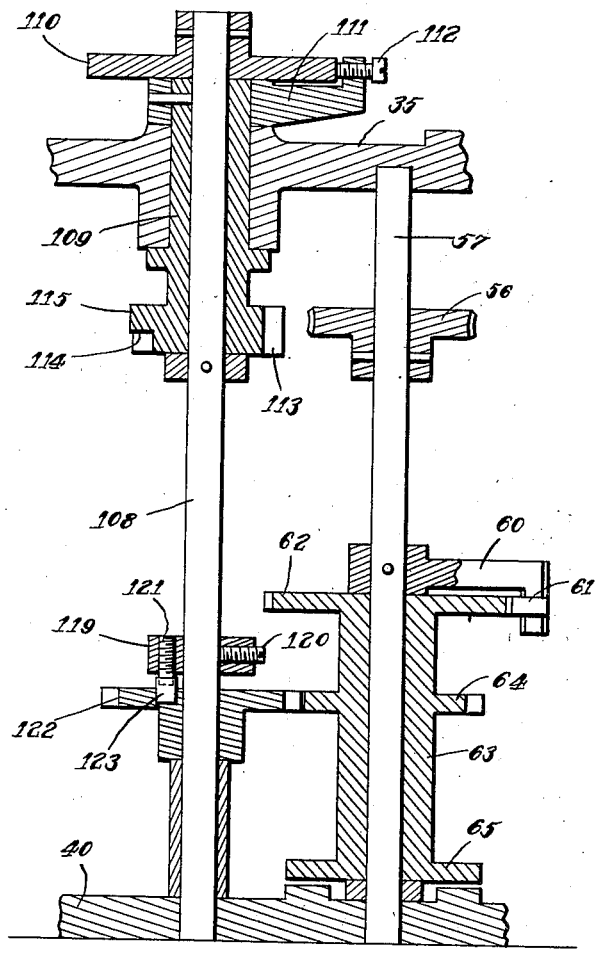
Figure 8:
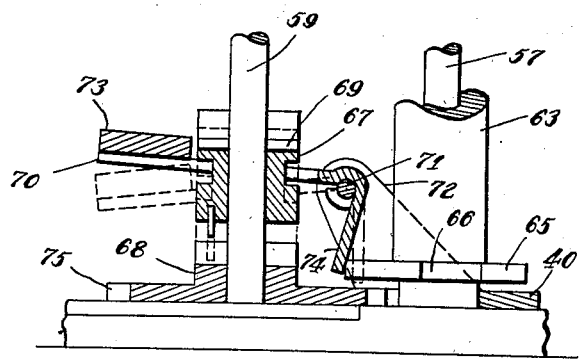

Figs. 3, 4, and 5 are horizontal sections taken on the lines 3—3, 4—4, and 5—5 respectively of Fig. 2;

Fig. 6 is a longitudinal, vertical section through the mechanism taken in the plane of the line 6—6 of Fig. 3;

Fig. 7 is a vertical, sectional detail taken on the line 7—7 of Fig. 4;

Fig. 8 is a fragmentary, vertical, sectional detail taken on the line 8—8 of Fig. 4;

Fig. 9 is an electric circuit diagram for the mechanism;

Fig. 10 is a diagram of a modification;

Fig. 11 is another diagram for a further modification; and

Figure 12:
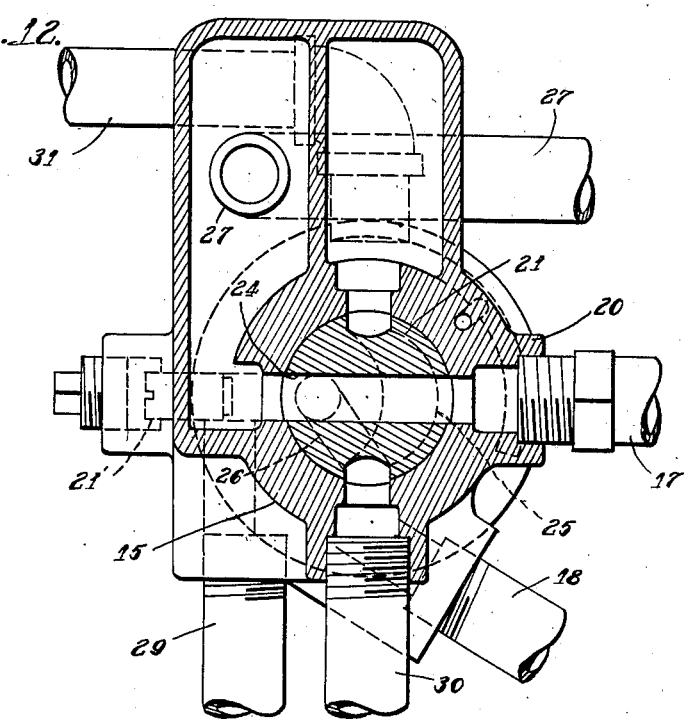
Figure 13:
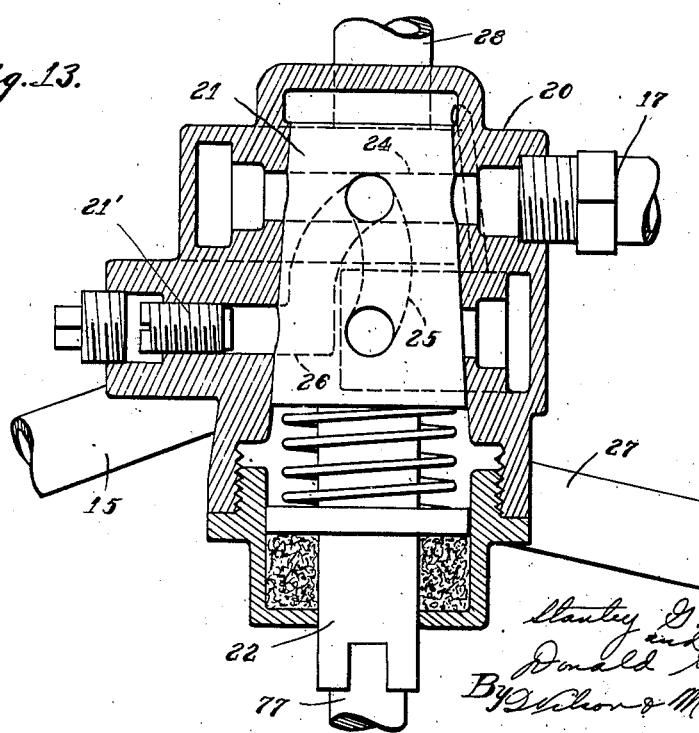

Figs. 12 and 13 are horizontal and vertical sections through the control valve.

Throughout the views the sections are taken looking in the direction of the arrows and similar numerals are applied to corresponding parts.

Before proceeding with a detailed description of the valve operating mechanism with which the present invention is more particularly concerned, reference may be had to Figs. 1, 12, and 13 for a general understanding of the water softening system and the control valve therefor in connection with which the mechanism of the present invention is arranged to be used. The valve 15 controls the connections between the softener tank 16 and the water supply and service systems communicating with the pipes 17 and 18 respectively, and also the communication between the softener tank 16 and a regenerating brine tank 19. The valve forms the subject matter of our Patent 1,593,300, issued July 20, 1926, and, briefly stated comprises a casing 20 and a rotatable plug or core 21 having a stem 22 rigid therewith and extending from the casing for operation by the mechanism within the oil-tight case 23. The plug 21 has three ports therein, 24, 25, and 26 arranged to register with ports in the casing 20 when the plug is shifted to different positions successively for the softening operation, regenerating operation, and the rinse. Pipes 27 and 28 lead from the valve 15 to the bottom and top of the softener tank 16. Pipes 29 and 30 are respectively the inlet and outlet pipes for the brine tank 19 and communicate with the valve 15, as shown. The pipe 31 is the waste pipe leading to the sewer. A drain pipe 32 is also provided leading from the bottom of the softener tank 16 through a valve 33 to the sewer. The provision of the pipe 32 and valve 33 is no special incident of the present invention and merely serves for the draining of sediment that may collect in the bottom of the softener tank. As described in our patent above referred to, with the valve in its normal position for the softening operation, water from the supply system enters through the pipe 17, as indicated by arrow 1, passes through registering ports in the valve 15 out through pipe 27, as indicated by arrow 2, into the bottom of the tank 16, thence upwardly through the mineral in the tank and out through pipe 28, as indicated by arrow 3, thence through registering ports in the valve 15 out through pipe 18, as indicated by arrow 4, to the service system. All of the arrows referred to are solid line arrows. The dotted arrows and dot and dash arrows represent the direction of flow for the regenerating operation and rinse. When the softener has taken care of its full capacity as determined by the setting of the control mechanism in the case 23, as will hereinafter appear, the plug 21 is shifted to a position 90° advanced from its normal position for the regenerating operation. In this operation the water enters through pipe 17, as indicated by dotted arrow 1, and passes through registering ports in the valve 15 out through pipe 29, as indicated by dotted arrow 2, into the inlet opening of the brine tank 19, then through the outlet opening of the brine tank through pipe 30, as indicated by dotted arrow 3, into the valve 15 and through registering ports therein out through pipe 28, as indicated by dotted arrow 4. The water entering pipe 17 is, of course, fresh hard water. The volume thereof allowed to enter the inlet opening of the brine tank 19 displaces a like volume of brine through the outlet opening into the pipe 30. The fresh water is metered at the valve operating mechanism and by regulating what volume of fresh water will flow into the inlet of the brine tank a correspondingly regulated volume of brine is fed to the softener tank. During the regenerating operation the rate of flow of the brine through the tank 16 is controlled by means of a suitable restriction valve shown at 21'. The brine passes through the pipe 28, as stated before, as indicated by the dotted arrow 4, into the top of the softener tank 16 and passes downwardly through the mineral therein and out through the pipe 27, as indicated by the dotted arrow 5. The brine replaces the calcium and magnesium of the exhausted mineral with sodium in accordance with the base-exchange principle, as is well known in the art. The brine from the pipe 27 enters the valve 15 and passes through registering ports therein out through pipe 31, as indicated by dotted arrow 6, for discharge to the sewer. The valve plug 21 upon the completion of the regeneration is shifted to its next position 90° advanced from the regeneration position for the rinse or flush. In this operation the fresh hard water enters through pipe 17 and, as indicated by the dot and dash arrow 1, flows into the valve 15, thence through registering ports therein out through pipe 27, as indicated by dot and dash arrow 2, into the bottom of the softener tank 16. The direction of flow is upward through the mineral in the tank 16 as in the normal softening operation. The water passing through the mineral is softened and displaces from the tank whatever volume of hard water may be contained in the head space above the mineral and also flushes out any residual brine. The waste water leaves the tank through pipe 28, as indicated by dot and dash arrow 3, and enters the valve 15 for discharge through registering ports therein through the pipe 31, as indicated by dot and dash arrow 4. The volume of water used in flushing is also metered in the same way as the water was metered which displaced the brine from tank 19 for the regeneration. As soon as a predetermined volume of flush water has passed through the tank, the valve plug 21 is shifted further through 180° and thus back to its initial position for the normal softening operation. It is believed the foregoing conveys a sufficiently clear understanding of the operation of the rotary plug 21 of the valve 15 required in the operation of the system described, that a basis is laid for the better understanding of the valve operating mechanism which will now be described.

The valve operating mechanism, as stated before, is housed in an oil-tight case 23 to operate in an oil bath. Brackets 34 support a top plate 35 which serves as the main frame for the mechanism. The plate 35 also provides a closure for the case 23 and provides a place whereon to support the valve 15, as on posts 36, and for mounting the meter 37 connected with the water supply pipe 17. At one end of the top plate 35 a bracket 38 supports an electric motor 39. The latter, when its electrical connections are completed at the proper intervals by the mechanism operated from the meter 37, is arranged through suitable intermediate connections with the stem 22 of the valve plug 21 to turn the latter first through 90° from the normal softening position for the regenerating operation; then through another 90° to the rinse position; and finally through further 180° back to its initial position for the normal softening operation. The degrees of movement of the valve plug are, of course, determined by the special construction of the valve. Any valve suitable for the present purposes may be utilized although we prefer to employ one of the type shown in Figs. 12 and 13 and fully described and claimed in our said Patent No. 1,593,300.

The top plate 35 supports a bottom plate 40 in spaced relation by means of a post 41 between the two plates at one end and a leg 42 depending from the top plate 35 at the other end. The two plates provide bearings, as will appear in the course of the description, for the various shafts bearing the parts of the operating mechanism. From this point on the different sections of the mechanism will be discussed separately under appropriate heads.

Meter gear train

The meter driven shaft 43 is, of course, turned in proportion to the amount of water passing through the meter 37 from the pipe 17. This shaft turns a worm 44 meshing with a worm gear 45 loose on the shaft 46, which is received in bearings 47 carried on the under side of the top plate 35. The worm gear 45 is fixed to a ratchet gear 48. The latter is arranged to turn a ratchet 49 when coupled therewith. The latter has its hub 50 splined on the shaft 46 and is arranged to be shifted into and out of mesh with the gear 48 by a yoke 51 pivoted at 52 beneath the top plate 35. Normally the ratchet gear 48 and ratchet 49 are held in engagement by a coiled compression spring 53 operating between the ratchet 49 and one of the bearings 47. The shaft 46 has a worm 54 and a bevel gear 55 fixed to the free end thereof adjacent one of the bearings 47. The worm 54 meshes with a worm gear 56 fixed to the vertical shaft 57 bearing at opposite ends in the top and bottom plates 35 and 40. The bevel gear 55 meshes with a bevel gear 58 fixed to another vertical shaft 59. Thus the two shafts 57 and 59 are driven from the meter 37 whenever the ratchet 49 is engaged. The shaft 57 has an arm 60 fixed thereon bearing a pawl 61 spring-pressed into engagement with a ratchet wheel 62 loose on the shaft 57. The ratchet wheel 62 has integral with its hub 63 a spur gear 64 and a peripheral cam 65, the latter being provided with a single notch 66 (see Fig. 5). The cam 65 controls the engagement of clutch elements 67 and 68 on the shaft 59. The element 67 is driven with the shaft by the pin 69 and is normally held out of engagement with the element 68 by a lever 70 pivoted at 71 on brackets 72 mounted on the bottom plate 40. The lever 70 may be provided with a weight 73 to insure the dropping of the clutch element 67 into engagement with the element 68 when the lever 70 is free to move. The lever 70 is normally held raised by a finger 74 engaging on the periphery of the cam 65 but will drop when the finger 74 rides into the notch 66 on the cam 65. The notch 66 is displaced angularly from the finger 74 to an extent determining the capacity run of the softener. That is, the displacement of the notch 66 from the finger 74 will determine how many gallons of hard water will pass through the meter 37 for softening before the regeneration of the softener will occur or at least before the mechanism is in a condition preparatory to the regeneration. The reason for qualifying this last statement is that the mechanism in the case of semi-automatic operation may be postponed in accomplishing the shifting of the valve 15 from the softening position to the regeneration position to suit the convenience of the user. This point of delaying the occurrence of the regeneration will be brought out fully hereinafter. When the clutch elements 67 and 68 come into engagement, the element 68, which is otherwise free on the shaft 59, is turned with the shaft and drives the gear 75 since the element 68 is actually the hub of this gear. The gear 75 meshes with a gear 76 mounted free on a vertical shaft 77. The gear 76 has a cam disk 78 secured thereto provided with notches in the periphery thereof at 79 and 80 displaced 180° apart. The cam disk 78 and a companion cam disk 81, which will be referred to under the head of "Switch escapement", control the position "on" or "off" of a switch 82 controlling the circuit for the motor 39. The meter gear train functions to accomplish the closing of the circuit by allowing the switch 82 to move to its "on" position. Then the motor 39, through connections next to be referred to under the head of "Valve gear train", shifts the valve through an angularity permitted by the switch escapement. Hence the relationship between the meter gear train, the valve gear train, and the switch escapement will be clear.

Valve gear train

The valve 15 has its stem 22 coupled with the shaft 77 as at 83. A worm gear 84 is pinned to the shaft, as at 85, to turn the valve successively to its different positions. The worm gear 84 is driven intermittently whenever the circuit for the motor 39 is properly completed. The driving connection between the worm gear 84 and the motor 39 includes a worm 86 fixed on a transverse shaft 87 received in suitable bearings at opposite ends in the frame-work, one of these bearings being in the leg 42 depending from the top plate 35 and the other being in a lug 88 depending from the top plate. The shaft 87 is driven by a worm gear 89 meshing with a worm 90 fixed on a shaft 91 coupled to the motor 39, as at 92, (see Fig. 1). It will be clear that a considerable reduction is afforded through the worm and gear connections 90—89 and 86—84. A comparatively low-powered motor can, therefore, be employed in the shifting of the valve. The shifting of the valve is also accompanied with the winding up of a coiled torsion spring 93 which, as will presently appear, provides the stored energy for turning the switch 82 when this is permitted by the switch escapement next to be described. The spring 93 has its inner end fixed to the shaft 77, as indicated at 94, while its outer end is fixed to a pin 95 projecting from the side of a spur gear 96 free upon the shaft 77. A casing 97 is provided on the gear 96 to enclose the spring 93. The pin 95, as shown in Fig. 6, extends through the casing 97 for a purpose presently to be described.

*Switch escapement*

The switch 82 may be any standard type of turn switch for making and breaking the circuit by continuous rotation of the stem thereof in one direction. The present switch is arranged to make and break by successive quarter turns. The one quarter turn to close the circuit is given the switch through the meter gear train. The next quarter turn to break the circuit is given the switch through the valve gear train; more particularly, the gear 96 actuated by the spring 93. The switch escapement determines whether the switch may be turned on or off. The switch has the stem thereof turning with the vertical shaft 98. The rotation of the shaft is secured by a train of gears 99, 100, and 101. The gear 99 is in mesh with the gear 96, as shown in Fig. 4, and drives the gear 100 meshing with the gear 101 fixed to the shaft 98. The gear 101 is normally urged to turn in a counter-clockwise direction by the action of the spring 93 but is free to turn only when a cross gear 102 is free to turn. The cross gear 102 has an upper pair of teeth 103 and 103' and a lower pair of teeth 104 and 104', each 180° displaced and the pairs 90° displaced from one another. The upper teeth 103 and 103' are arranged to be received in any one of three notches 105, 106, and 107 provided in the periphery of the cam disk 81. The lower teeth 104 and 104' are arranged to be received in either one of the notches 79 and 80 provided in the lower cam disk 78. Referring to Fig. 5, it will be seen that the tooth 104 is holding the gear 102 against counter-clockwise rotation by riding on the periphery of the cam disk 78. In the position shown in this figure the tooth 103 has just been released from the notch 105 in the upper cam disk 81 and the gear 102 has turned through 90° to "off" position, the parts being assumed in the normal softening position at the commencement of the capacity run. The disk 78, as stated above, is rotated near the end of the capacity run when the clutch elements 67 and 68 are brought into engagement by the arrival of the notch 66 in the disk 65 adjacent the finger 74 of the lever 70. The gear 76 is then driven through a train of gears from the meter 37. The disk 78 is driven in a clockwise direction and the notch 80, in the course of 180° travel from the position shown in Fig. 5, receives tooth 104 and permits the gear 102 to turn through about 45° with the tooth engaged in the notch, until the tooth arrives at a position where it clears the side of the notch, whereupon the gear turns under the action of the spring 93 to complete 90° movement from the position shown. The switch 82 is thereby turned on. The gear is then held in its position by the tooth 103' coming into engagement with the upper cam disk 81. As soon as the switch is turned on, the shaft 77 is, of course, turned by the motor. This turns the cam disk 81. The motor will continue to operate until the notch 106 arrives at a position where it picks up the tooth 103' and turns the gear 102 around through about 45° when the tooth 103' is released from the notch 106 and the cross gear 102 is again moved under the action of the spring 93 to complete the second 90° movement. This brings the switch back to its "off" position. The valve has meanwhile been turned in the turning of the shaft 77 from the normal softening position to the regenerating position. The next operation of the valve is through another 90° to the rinse position. This 90° movement involves the operation of the motor which, of course, further involves the turning on and the turning off of the switch a second time. The teeth 104' and 103 figure in the turning on of the switch and the turning off in the same manner as the teeth 104 and 103', as described above. Following the rinse position the valve is shifted through 180° movement. The 180° movement corresponds to the travel of the disk 81 from the notch 107 to the notch 105 in a clockwise travel of the disk. This leaves the valve in its normal softening position. It should be clear from the foregoing that the notch 105 is related to the normal softening position of the valve as the switch 82 is turned off leaving the valve in the softening position when the tooth 103 or 103' escapes from the notch 105. The notch 106 is related to the regeneration position of the valve, the tooth 103 or 103' in a similar manner producing the turning off of the switch when it escapes from this notch. The notch 107 is related to the rinse position of the valve since the tooth 103 or 103' upon release from this notch brings the switch 82 to "off" position with the valve in the rinse position. The angular displacement of the notches 105, 106, and 107 90° apart is related to the 90° displacement of the valve in its three corresponding positions, namely, the normal softening position, the regeneration position, and the rinse position. The ratio between the gears 96 and 101 is as three to two thereby necessitating one and one-half turns of the gear 101 for each turn of the gear 96. This is required because the cross gear 102 has to make one and one-half turns for each cycle of operations, as will be clear from the foregoing description of the cycle. The gear 96 in one complete cycle of operations, as described above, from the softening position of the valve through the cycle back to the softening position is given a complete turn. The spring thereof is wound up intermittently between the intermittent turning of the gear while the valve is being turned. Thus the tension of the spring always remains substantially constant, that is, it is not wound up any more in the course of repeated operations of the mechanism than it is allowed to unwind. It is believed this description conveys a clear understanding of the purposes and operation of the switch escapement.

Resetting gear train

The setting of the machine for different hardnesses of water involves the displacing of the notch 66 in the cam 65 a predetermined angularity from the finger 74, as previously described. That is, if the water to be softened is comparatively hard, the capacity run should necessarily be smaller than if the water to be softened is not as hard. For example, for harder water the notch 66 will be displaced from the finger 74 for a lesser travel of the disk than for water of lesser hardness. After the regenerating and rinse operations, it becomes necessary to reset the disk to exactly the same position which it occupied at the beginning of the previous capacity run. The resetting gear train which will now be described is provided to accomplish this purpose. An index shaft 108 is received in a bearing in the bottom plate 40 and extends through a sleeve 109 received in a bearing in the top plate 35. An indexing disk 110 is fixed to the upper end of the shaft 108 and provided with suitable index marks relative to grains of water hardness thereon, as indicated in Figs. 2 and 6. The sleeve 109 has an arm 111 pinned thereto having a set screw 112 in the outer end thereof to be threaded into engagement with the periphery of the disk 110. The tightening of the screw 112 serves to set the disk 110 in any desired position of adjustment with respect to the sleeve 109 and correspondingly determines a definite angular relationship between the shaft 108 and a gear 113 rigid or integral with the sleeve 109. The gear 113 has one tooth thereof notched out, as indicated at 114, leaving the upper segment thereof 115 to be engaged by a pilot tooth 116 fixed on the top of a gear 117. The gears 117 and 113 constitute a pair of intermittent gears. The gear 117 has a sufficient number of teeth to produce a complete turn of the gear 113 when the gear 117 is given a complete turn. The gear 117 is fixed to the worm gear 84, as indicated at 118 in Fig. 6. The worm gear 84 it will be remembered is given a complete turn in each cycle of operations of the mechanism. The pilot tooth 116 on the gear 117 serves by engagement with the segmental tooth 115 to commence the rotation of the gear 113. A collar 119 is fixed to the shaft 108 as by means of a set screw 120. A pin 121 is threaded into the collar 119 and projects from the under side thereof over a gear 122 mounted free on the shaft 108. The gear 122 meshes with the gear 64 previously referred to and has a pin 123 projecting from the top thereof on the same radius as respects the shaft 108 as the pin 121. In operation, the pin 121 during the turning of the shaft 108 through a complete revolution in the complete revolution of the gear 113 encounters and moves the pin 123, thereby turning the gear 122. It will be clear that during the softening operation, the regeneration, and the rinse, the cam 65 travels through part of a complete turn. In the travel of the cam 65 the gear 64 is turned likewise, thereby turning the gear 122. The pin 123 is thereby advanced through an arc away from the pin 121 the same number of degrees as the cam 65 has traveled. Now when the resetting takes place the collar 119 makes a complete turn and in the course of this turn the pin 121 encounters the pin 123 where the latter has stopped, thereby picking up the gear 122 and causing it to travel the rest of the way with the collar 119 back to the initial position in which the parts were when the softener commenced its previous capacitive run, that it, at the commencement of the softening operation. When the gear 122 drives the gear 64 the shaft 57, because of the meshing of the worm gear 56 with the worm 54, is held against rotation. Consequently the ratchet wheel 62 overruns the pawl 61. It will thus be clear that the resetting gear train always leaves the cam 65, after the rinse operation and at the beginning of the softening operation, in precisely the same position which it occupied at the commencement of the previous capacity run. The position of the pin 121 determines the position of the cam 65, as will be clear from the description above. The position of this pin, however, is fixed by the setting of the indexing disk 110. In fact, the operator can change the starting position of the cam 65 by turning the indexing disk 110 when he has loosened the screw 112. The disk 110 when turned turns the shaft 108 and with it the collar 119. The pin 121 by engagement with the pin 123 turns the gear 122. The latter meshing with the gear 64 turns the cam 65, the ratchet wheel 62 meanwhile overrunning the pawl 61. In this way it is obvious that the operator can readily change the setting of the machine at will and if desired can cause the valve-operating mechanism to go through its cycle of valve movements for regeneration and rinse at any time. This latter feature would be of advantage for example if it should occur that the salt supply in the regenerating brine tank were to become exhausted and the regeneration and rinse operations were gone through without any brine being present to regenerate the mineral in the softener tank. In that case the operator after replenishing the salt supply could move the cam 65 by hand, by operation of disk 110, to set the mechanism into operation for the regeneration and rinse. After accomplishing this the cam could be reset to whatever position it occupied before as required for the hardness of the water to be softened.

*Alarm and semi-automatic feature*

The mechanism, as will now be described, may be controlled to operate in three different ways. First, it may be fully automatic. That is, whenever the capacity run of hard water has been passed through the softener tank to be softened and the cam 65 has released the finger 74 so that thereafter the switch 82 is closed, the mechanism will operate the valve through the regeneration and rinse positions and back to its normal softening position irrespective of the time when the capacity run is completed. Second, it may be semi-automatic. That is, the softener after completing the capacity run may, through suitable manual control of a switch at a control station, have the time determined when the regeneration and rinse operations will occur entirely at the convenience of the operator. In connection with this switch at the control station there may be provided a suitable alarm signal in the form of either an audible alarm or visual alarm. For most purposes an alarm signal light is found to be most suitable. Whenever this signal functions the operator is aware that it is time for regeneration of the softener. He will then, whenever convenient, close the control switch to allow the regeneration and rinse operations to be completed. Third, the machine may be time controlled in its operation. That is, irrespective of the time when the normal capacity run of the softener is completed, the time for regeneration and rinse will be determined by the setting of a control clock to occur at any time selected by the operator as, for example, at some time during the night when the regeneration and rinse operations can be gone through without any inconvenience to anyone. In the first case, that is, of fully automatic operation, the moment the switch 82 is closed there is nothing requiring manual operation or clock operation to determine when the motor circuit will be completed. For example in Fig. 9, wherein a dotted connection is shown at 124, a circuit is completed through the motor 39, upon the closing of the switch 82, from the line terminal 125 through the switch 82, connection 124, conductor 126, motor 39, and conductor 127 to the other line terminal 128. Where fully automatic operation is desired there is usually some provision for by-passing hard water to the service system during the regeneration and rinse. In the present case a valve 129 is shown in elevation. In Fig. 1 connecting the supply line 17 with the service line 18, which may be a manually controlled valve but is preferably a spring-loaded restriction valve, there being provision in the bonnet portion thereof for spring loading the valve to hold the same seated during normal softening operation. It is obvious that during the regeneration and rinse, the valve 15 having closed the communication between the supply line 17 and the service line 18, the pressure of the water in the supply line 17 will unseat the valve 129 to allow a flow of hard water directly to the service system when a faucet is opened. Such valves are of standard construction and the details thereof need not be further discussed.

In the case of semi-automatic operation a two-way switch 130 is provided in the mechanism mounted on the under side of the top plate 35. This switch has an armature 131 arranged to make contact normally at 132 with one terminal 133 but when shifted to its other position it makes contact at 134 with the other terminal 135. The armature 131 has an arm 136 depending therefrom for moving the same from contact with the terminal 133 into contact with the terminal 135. The shifting yoke 51 previously referred to for shifting the ratchet 49 has a link 137, provided with a length adjusting turn buckle 138, connected with an arm 139 pivoted to a vertical shaft 140 extending between the top and bottom plates of the frame. The arm 139 is arranged to be swung in a counter-clockwise direction, as viewed in Fig. 3, to disengage the ratchet 49 from the gear 48 when the pin 95 previously referred to comes into engagement therewith during the clockwise rotation of the gear 96. It will be remembered that this gear makes a quarter turn during the closing of the switch 82 at the commencement of the regeneration, that is, at the time when the valve 15 is in a position for the regeneration operation. This qualification of the previous statement is necessary in view of the fact that the regeneration may be delayed by the operator to occur at any time to suit his convenience. The disengagement of the ratchet 49 permits the meter 37 to continue to operate but without turning the shaft 46 and driving the meter gear train previously described. Usually some leeway is allowed in the setting of the dial 110 so that even though the regeneration does not occur immediately when the softener has completed its capacity run, the hard water passed therethrough for an additional period will be softened sufficiently for most practical purposes. In an ordinary household installation, for example, there can be considerable delay in the regeneration of the softener without seriously affecting the quality of the water in the system as respects softness. The water will, of course, gain in hardness in proportion to the length of time the regeneration is delayed. Disconnection of the meter in the manner described is necessary only where the regeneration of the softener is capable of being delayed. The meter will also have to be disconnected, therefore, in the case of time controlled operation as in that case the regeneration may oftentimes be considerably delayed. The moment, however, that the auxiliary circuit controlling means such as a switch 141 shown in the circuit diagram in Fig. 9 is closed so that the motor 39 is free to operate, the valve 15 will be shifted toward its regeneration position. Upon the completion of this shifting of the valve, the gear 96 is turned, by the properly timed release of the cross gear 102 by the cam 81, to open the switch 82. This movement of the gear 96 brings the pin 95 away from the arm 139 and the yoke 51 is free to move under the impulse of the spring 53 to re-engage the ratchet 49 with the gear 48. The purpose in this is to allow the meter 37 to measure the amount of regenerating brine caused to pass through the water softener tank. As above described, the volume of brine caused to pass through the softener is determined by the amount of water allowed to pass through the meter, since this water displaces the brine from the regenerating brine tank 19. This is believed to be clear from the description thereof above given. The re-engagement of the ratchet 49 is accompanied with the disconnection of the armature 131 with the terminal 135 and the connection of the armature 131 with the terminal 133. Referring again to Fig. 9, it will be seen that the purpose of the contact at 132 with the terminal 133 is to complete a circuit as follows:—from the terminal 125, through the switch 82, conductor 142, conductor 143, armature 131, contact 132 of the terminal 133, conductor 144, conductor 126, to the motor 39 and through conductor 127 to the other line terminal 128. Previous, however, to the closing of the switch 141 the armature 131 is in engagement with the contact 134 of the terminal 135, as shown in dotted lines in this figure. Under these circumstances, a circuit is completed through an alarm signal lamp 145 preferably provided on a convenient panel 146 alongside the switch 141. This circuit is as follows:—from the line terminal 125 through switch 82, conductors 142 and 143, armature 131, contact 134 of terminal 135, conductor 147, lamp 145, and conductors 148 and 127 to the other line terminal 128. After the closing of the switch 141 for an interval long enough at least to insure the shifting of the valve 15 from its softening position to its regeneration position, that is, at least until the opening of the switch 82 and the accompanying movement of the pin 95 away from the arm 139 to re-establish connection between the armature 131 and the terminal 133, a circuit is completed directly through the motor 39 as follows:—from terminal 125 through switch 82, conductors 142 and 149, switch 141, conductors 150 and 126, motor 39, and conductor 127 to the other line terminal 128. That is, the switch 141 shunts the switch 130, as will be clear from the circuit diagram. It is believed that the foregoing description of the circuit diagram and of the manual controlling means will make it clear that the regeneration of the softener may be delayed as long as desired to suit the convenience of the operator. The switch 141 being located on a panel with the light 145 at any suitable control station as, for example, in the case of a household installation, the operator is aware at once of the need for regeneration and it then remains for him to select a convenient time to close the switch and cause the regeneration to occur. The closing of the switch is only necessary to commence the regeneration cycle of valve movements as the mechanism is constructed to go through these functions automatically. The switch 141 must, therefore, be opened afterward if the next regeneration is to be under the operator's control and at his convenience. Otherwise the machine will go through the regeneration automatically whenever the capacity run is completed. In Fig. 2 there is illustrated a roller 151 on the link 137 for operating the arm 136 of the armature 131. The screw 152 on which the roller 151 is mounted is preferably threaded in a collar 153 adjustable along the link 137 to advance or retard the relation of the armature 131 to the terminals 133 and 135. A very sensitive adjustment is, therefore, provided.

In the absence of a switch 130 in the mechanism, there may be provided, as shown in Fig. 11, a double pole double throw switch 154 on the panel 146 along with the signal lamp 145. This switch when in the one position, as shown in full lines, completes a circuit through the lamp 145 whenever the switch 82 is closed preparatory to commencing the movement of the valve 15 to its regeneration position. This circuit is as follows:—from the line terminal 125 through the switch 82, conductor 155, through the switch 154, conductor 156, lamp 145, conductors 157 and 158 to the other line terminal 128. Obviously, the situation then is similar as in the case of the circuit shown in Fig. 9, that is, the operator may delay the regeneration as long as he desires after he is aware that the softener has completed its capacity run because of the signal lamp 145 being lit. Whenever the switch is thrown to its dotted line position for regeneration of the softener, the following circuit is completed through the motor 39:—from the line terminal 125 through switch 82, conductor 159, motor 39, conductor 160, switch 154, conductors 161 and 158 to the other line terminal 128. With this form of control it is obvious that the switch 154 must remain in its regeneration position until the completion of the regenerating operation.

In the case of time controlled operation, the switch 130 is not required, nor is there any auxiliary switch 141 or 154 and signal lamp 145. A clock 162 may be provided capable of being set to complete a circuit at any selected time as, for example at four o'clock in the morning, as shown in Fig. 10, that is, at any time when there is apt to be no inconvenience resulting from the softener going through its regenerating operation. The clock 162 is preferably of the twenty-four hour type. That is, the hand 163 makes a complete turn once in every 24 hours. Thus any time during the day or night may be selected by the operator for regenerating the softener. The regeneration will obviously occur only when the switch 82 has been closed and the hand 163 travels around to a position where it makes contact with the terminal 164. The delay apt to occur between the time when the switch 82 is closed, that is, when the capacity run is completed, and the time when the hand 163 will make contact with the terminal 164 will not seriously affect the efficiency of the softener since the disk 110 may be set having the possibilities for delayed regeneration in mind. That is, in the case of a softener normally requiring regeneration after say one thousand gallons of water have passed through, may have the disk 110 set in such a way as to cause the mechanism to prepare for regeneration at any time when the softener has had, say nine hundred gallons of water passed therethrough. This allows a reserve of about 100 gallons which will be found sufficient for most practical purposes in the average household. The example just given is sufficient to illustrate this point.

It is believed that the foregoing description of the mechanism conveys a sufficiently clear understanding of the operation and purposes thereof that any one skilled in the art to which the invention relates will appreciate all the possible applicaitons thereof.

What we claim is:

1. A water softener having a circulation system by which water is passed through the softener to a service line in the normal softening operation and by which regenerating solution and water are passed through the softener and discharged otherwise than to the service line for regenerating and flushing operations, said system including a rotor valve controlling flow connections for the several operations, an electric motor operating said valve, and motor controlling means dependent upon a predetermined flow of water through the softener in the softening operation to initiate the operation of the motor and dependent upon predetermined flows through the softener in the regenerating and flushing operations to cause the motor to control the valve to terminate these respective operations, said motor controlling means comprising a device moved by force of the flow of water passing through the softener and mechanism controlled and operated thereby for controlling the circuit of said electric motor.

2. In a water softening aparatus, means moved by the incoming hard water, an electrical circuit, contact mechanism for making and breaking the circuit actuated by said means, a rotor valve for positioning the softener in softening position and regenerating position, a motor in said circuit to operate said rotor valve.

3. In a water softening apparatus, a tank for softening material, a rotor valve for directing the water passing through said tank for softening when the valve is in one position and when the valve is in another position directing brine to the tank to regenerate the softening material therein and draining the brine from the tank after it has regenerated the material, a motor to drive said rotor valve, and means to control the operation of the motor depending upon the amount of fluid passing through the tank and moved by force of the flow of said fluid.

4. A water softener having valve means and passages controlled thereby for flowing water and regenerating solution through the softener, an electric motor for operating said valve means, a controlling means comprising a device driven by flow of water through the softener, and means controlled by said device and operable pursuant to a predetermined flow for starting and thereafter controlling the motor to cause in order a succession of valve operations whereby to pass the softener from normal softening operation through the regeneration and back to normal operation, said last named means including a mechanism driven by said driven device during the regeneration and a switch operated and controlled by said mechanism and by the motor for making and breaking the circuit at the termination of softening and at the termination of regeneration.

5. A water softener having a circulation system by which water is passed through the softener to a service line in the normal softening operation and by which regenerating solution and water are passed through the softener and discharged otherwise than to the service line for regeneration and flushing, said system embodying flow-controlling valve means, an electric motor for operating said valve means, a normally open switch in the motor circuit, which switch is successively closed to energize the motor to set the valve means successively for regeneration, flushing and normal softening operation, means causing the opening of said switch as the valves are respectively set for regeneration, flushing and normal softening operation, and means moved by force of the flow of water passing through the softener controlling the periods for the successive closings of the switch.

6. A water softener having a circulation system by which water is passed through the softener to a service line in the normal softening operation and by which regenerating solution and water are passed through the softener and discharged otherwise than to the service line for regeneration and flushing, said system embodying flow-controlling valve means, an electric motor for operating said valve means, a normally open switch in the motor circuit, which switch is successively closed to energize the motor to set the valve means successively for regeneration, flushing and normal softening operation, said switch opening as the valves are respectively set for regeneration, flushing and normal softening operation, a meter arranged to be driven by flow of liquid passing through the softener, and switch-operating mechanism comprising meter-actuated means and motor-actuated means cooperating to cause the successive operations of the switch.

7. A water softener having valve means and passages controlled thereby for flowing water and regenerating solution through the softener, an electric motor for operating said valve means, a controlling means comprising a device adapted to be driven by force of the flow of water passing through the softener, and means controlled by said device and operable pursuant to a predetermined flow for starting and thereafter controlling the motor to cause in order a succession of valve operations whereby to pass the softener from normal softening operation through the regeneration and back to normal operation, said last named means including a mechanism driven by said water-driven device during the regeneration and a switch operated and controlled by said mechanism and by the motor for making and breaking the circuit at the termination of softening and at the termination of regeneration, said circuit including a normally open switch requiring to be closed to complete the circuit, and means operated by said flow-driven device for disconnecting said mechanism from said flow-driven device when the automatic switch first closes and until the subsequent closure of said other switch, whereby the automatic regeneration may be deferred until the closure of said other switch.

8. A water softener having means for regeneration including operating means operable to effect the regeneration, a clock controlling said operating means to permit operation thereof only at a predetermined time, and means controlled by flow of water through the softener and controlling said operating means to cause the operation of said regenerating means pursuant to a predetermined flow through the softener at the time permitted by the clock.

9. A water softener having means for regeneration including operating means operable to effect the regeneration, a clock controlling said operating means to permit operation thereof only at a predetermined time, and means controlled by flow of water through the softener and controlling said operating means to cause the operation of said regenerating means pursuant to a predetermined flow through the softener at the time permitted by the clock, said last named means including an electrical actuator and circuit therefor and a flow-operable means controlling said circuit, which circuit is also controlled by said clock to exercise the stated clock control of the regenerating means.

10. A water softener having means for regeneration including operating means operable to effect the regeneration; means controlling said operating means to prevent operation thereof until a predetermined condition in the normal operation of the softener is reached, and a clock also controlling said operating means, whereby said operating means is controlled to cause the regeneration pursuant to the reaching of said predetermined condition but at a deferred time determined by the clock.

11. A water softener having means for regeneration, including valve means to establish flow connections for regeneration, electrical means for operating said valve means, a switch controlling the current for said electrical means, a meter arranged to operate as water passes through the softener, means operated by said meter when a predetermined amount of water has passed through the softener for operating said switch, an auxiliary two-way switch in circuit therewith, and an electrical alarm signal device also arranged to be connected in circuit with said meter operated switch to be operated when said switch is operated, said two-way switch when in one position completing a circuit from said meter operated switch through said electrical alarm signal device and when in the other position being arranged to complete a circuit from said meter operated switch through the electrical valve operating device.

12. A water softener having means for regeneration, including valve means operable to establish flow connections for regeneration, electrical means for operating said valve means, switch mechanism controlling the circuit for said electrical means, an escapement controlling the operation of said switch mechanism, a meter arranged to be operated by a flow through the softener, and means operated by said meter when a predetermined amount of fluid has passed therethrough for operating said escapement.

13. A water softener having means for regeneration, including valve means normally establishing connections for a flow of water through the softener and operable to establish connections for flow of regenerating solution through the softener, a flow operated device, and means controlled thereby for operating said valve means comprising an electrical device, switch mechanism controlling the circuit therefor, an escapement controlling the operation of said mechanism, a part of the means operated by said flow operated means being arranged intermittently to release said escapement to operate said switch mechanism to complete the circuit through said electrical device, and means operating with said valve means for intermittently releasing said escapement to operate said switch mechanism to break the circuit through said electrical device.

14. A water softener having means for regeneration, including valve means normally establishing connections for a flow of water through the softener and operable to establish connections for flow of regenerating solution through the softener, a flow operated device, and means controlled thereby for operating said valve means comprising an electrical device, switch mechanism controlling the circuit therefor, an escapement controlling the operation of said mechanism, a part of the means operated by said flow operated means being arranged intermittently to release said escapement to operate said switch mechanism to complete the circuit through said electrical device, and means operating with said valve means for intermittently releasing said escapement to operate said switch mechanism to break the circuit through said electrical device, the said means normally tending to operate said escapement and switch mechanism in one direction comprising a spring arranged to be wound intermittently in the intermittent operation of said valve means.

15. A water softener having means for regeneration, including valve means normally establishing connections for a flow of water through the softener and operable to establish connections for flow of regenerating solution through the softener, a flow operated device, an electrical device for operating said valve means, a switch controlling the circuit for said electrical device, means normally tending to operate said switch in one direction to make and break the circuit through said electrical device, a release for said means whereby the latter is intermittently operated, and means operated by said flow operated device when a predetermined amount of fluid has passed therethrough arranged to operate said release.

16. A water softener having means for regeneration, including valve means normally establishing connections for a flow of water through the softener and operable to establish connections for flow of regenerating solution through the softener, a flow operated device, an electrical device for operating said valve means, a make and break device for intermittently making and breaking the circuit through said electrical device, and means operated by said flow operated means for operating said make and break device comprising a low ratio train of driving connections, a high ratio train of driving connections, and a shifting means whereby said flow operating device may operate through a comparatively long period before operation of the valve means and through only a comparatively short period between certain operations of the valves.

17. A water softener having means for regeneration, including valve means normally establishing connections for a flow of water through the softener and operable to establish connections for flow of regenerating solution through the softener, a flow operated device, an electrical device for operating said valve means, a make and break device for intermittently making and breaking the circuit through said electrical device, means operated by said flow operated means for operating said make and break device comprising a low ratio train of driving connections, a high ratio train of driving connections, and a shifting means whereby said flow operating device may operate through a comparatively long period before operation of the valve means and through only a comparatively short period between certain operations of the valves, and means for automatically resetting said low ratio train after an operation of the valve means to restore the normal flow conditions.

18. In a water softening apparatus, a container for water softening material subject to periodic reconditioning of the softening material, a single source of water supply for said apparatus during the softening and reconditioning periods, a source of supply of rejuvenating fluid, a series of conduits for variously connecting the container with the source of water supply, and with the source of supply of rejuvenating fluid and with a service distribution outlet and with a drain outlet, and a motor operated single multiway valve controlling such periodic operation in accordance with the amount of water supplied from said single source during each such period of operation and an electric motor for automatically operating said valve at the conclusion of each such period, said motor having an electric switch in its energizing circuit adapted to be intermittently closed by force of the flow of several predetermined amounts of water supplied during the respective periods of operation, the switch being opened by means independent of said water flows.

19. In a water softening apparatus, a container for water softening material, a container for rejuvenating agent, a meter driven by and measuring the water flow during successive stages in a cycle of different operations, a rotary valve differently directing the flow of water during the successive stages of the cycle of operation, and a motor energized by a source of power independent of the water supply but governed thereby for intermittently actuating the valve to its succesive positions of adjustment, said independent motor having starting means moved by the meter in automatic response to respective and predetermined quantities of water flowing through the meter during said successive operative stages.

20. In a water softening apparatus, a container for water softening material, a container for rejuvenating agent, a meter measuring the supply of water thereto and driven by force of the flow of said water, a system of conduits for variously connecting said containers with each other and with a hard water supply and with a drain outlet, an adjustable valve common to the conduits of said system controlling the flow of said water during successive stages of softening, rejuvenation and washing, means energized by a source of power independent of the water supply for intermittently actuating the valve through successive steps of adjustment, and means for intermittently starting said valve actuating means, said starting means being moved by said meter and controlled thereby, in accordance with the respective quantities of water flowing through the meter during the successive stages of softening, regeneration and washing.

21. In a water softening apparatus, a container for water softening material subject to periodic reconditioning of the softening material, a single source of water supply during the softening and reconditioning periods, a motor actuated valve for controlling the water supply, an electric motor therefore, a meter measuring said several water supplies and driven by flow thereof, means moved and controlled by the flow of water through the meter for starting the motor upon completion of flow of predetermined quantities of water, and means actuated by the movement of said valve for automatically restoring the motor starting means to inoperative position upon completion of the resulting adjustments of the valve.

22. In a water softening apparatus, a container for softening material, a container for rejuvenating agent, a source of water supply, a meter driven by the flow thereof and determining the extent of successive periods of softening, rejuvenation and washing by the several quantities of water passing through the meter during said periods, a valve controlling the flow of water during such successive stages of operation, and an electric motor for setting the valve, said motor having a starting switch intermittently operated by the meter.

23. In a water softening apparatus, a container for water softening material, a container for rejuvenating agent, a meter measuring the supply of water to the apparatus and having parts moved by the flow of water through the meter, an adjustable valve controlling the flow of said water during successive stages of softening, rejuvenating and washing, an electric motor actuating said valve and a motor switch having an operative connection with the meter and intermittently closed thereby in accordance with several predetermined quantities of water flowing through the meter during successive stages in the cycle of operation and means for restoring said motor switch by the operation of the motor wholly independent of the water flow.

24. A water softening apparatus, wherein a body of water-softening material is periodically reconditioned by the circulation therethrough of a quantity of rejuvenating agent and subsequently washed preparatory to further softening operation, characterized by a meter driven by and measuring the flow of water during the successive stages of softening and reconditioning, a control valve variously directing the water flow during such successive stages, an actuating motor for said valve, a motor moved switch, means moved by the meter for periodically closing the switch, and means operated by the motor for automatically opening the switch upon the completion of adjustment of the valve for each succeeding stage of operation.

25. In a water softening apparatus wherein a body of water softening material is periodically reconditioned by the passage therethrough of a quantity of rejuvenating liquid and subsequently washed, including an automatically adjustable control valve intermittently operated by power means independent of the water flow through the apparatus and variously directing the several water flows during the successive stages of softening and reconditioning, a meter driven by and measuring the several water flows during the different stages of operation and a timing mechanism controlled by the meter and actuated by the meter after several predetermined quantities of water flow during said stages, said timing mechanism being adapted to cause intermittent operation of the control valve by the independent power means.

26. A water softening apparatus wherein a body of water softening material is periodically reconditioned by the circulation therethrough of a quantity of rejuvenating agent and subsequently washed, including a water supply and service distribution system and an adjustable valve variously directing the water flow during the successive stages of a cycle of softening and reconditioning, characterized by a meter driven by and measuring the several water flows, an electric motor for intermittently actuating the valve, an electric switch controlling the motor, and switch timing mechanism having operative connection with the meter and controlled thereby to effect the closing of the switch and operation of the motor upon completion of the delivery of predetermined quantities of water through the meter in each successive stage of the cycle of operations, and means for automatically opening the switch and arresting the motor upon the adjustment of the valve to its succeeding position in said cycle of operations.

27. An automatic base-exchange water softening apparatus adapted to operate in a cycle of several successive stages, comprising a multiway valve controlling all the operations of said cycle, a motor operating said valve and having a source of power independent of the water supply to the softening apparatus, a water meter driven by and measuring the flow of water during each of said stages and a timing mechanism having operative connection with said meter and controlled thereby to automatically start the valve-operating motor for beginning each of the successive stages in the cycle of operations.

28. An automatic base-exchange water softening apparatus adapted to operate in a cycle of several successive stages, comprising a multi-way valve controlling all the operations of said cycle, a motor operating said valve and having a source of power independent of the water supply to the softening apparatus, a water meter driven by and measuring the flow of water during each of said stages, a timing mechanism having operative connection with said meter and controlled thereby to automatically start the valve-operating motor at the beginning of each of the successive stages in the cycle of operations, and means connected to said motor for automatically stopping said motor at the completion of each valve operation.

In witness of the foregoing we affix our signatures.

STANLEY G. HARWOOD.
DONALD G. GRISWOLD.

CERTIFICATE OF CORRECTION.

Patent No. 1,910,011.  May 23, 1933.

DONALD G. GRISWOLD, ET AL.

It is hereby certified that error appears in the printed specification of the above numbered patent requiring correction as follows: Page 3, line 2, for "oepration" read "operation"; page 5, lines 110 and 111, for "capacitive" read "capacity", and line 111, for "it" read "is"; page 11, line 118, claim 24, for "moved" first occurrence read "control"; page 12, line 3, claim 25, for "he" read "the"; and that the said Letters Patent should be read with these corrections therein that the same may conform to the record of the case in the Patent Office.

Signed and sealed this 27th day of June, A. D. 1933.

M. J. Moore.

(Seal)  Acting Commissioner of Patents.